United States Patent
Kuroki et al.

(10) Patent No.: US 12,523,213 B2
(45) Date of Patent: Jan. 13, 2026

(54) METHOD OF FORMING A DIAPHRAGM FOR A LIQUID PUMP

(71) Applicant: Walbro LLC, Cass City, MI (US)

(72) Inventors: Nobuyuki Kuroki, Sendai (JP);
Katsuaki Hamataka, Sendai (JP);
Mark S. Swanson, Concord, NC (US);
Tetsuya Takahashi, Shibata-Gun (JP);
Teruhiko Tobinai, Sendai (JP)

(73) Assignee: WALBRO LLC, Cass City, MI (US)

( * ) Notice: Subject to any disclaimer, the term of this patent is extended or adjusted under 35 U.S.C. 154(b) by 367 days.

(21) Appl. No.: 17/898,968

(22) Filed: Aug. 30, 2022

(65) Prior Publication Data

US 2022/0412337 A1    Dec. 29, 2022

Related U.S. Application Data

(62) Division of application No. 16/322,247, filed as application No. PCT/US2017/044837 on Aug. 1, 2017.

(Continued)

(51) Int. Cl.
*B29C 65/00* (2006.01)
*F02M 37/04* (2006.01)
(Continued)

(52) U.S. Cl.
CPC ............. *F04B 43/06* (2013.01); *F02M 37/04* (2013.01); *F02M 37/12* (2013.01);
(Continued)

(58) Field of Classification Search
CPC ......... B29C 65/00; B29C 65/78; B29C 51/00; B29C 51/10; B29C 51/30; F04B 43/0054; F04B 43/06
See application file for complete search history.

(56) References Cited

U.S. PATENT DOCUMENTS 1,957,697 A * 5/1934 Conway ................ F15B 15/065
92/48
3,192,836 A    7/1965 Karl
(Continued)

FOREIGN PATENT DOCUMENTS

CN    102678388 A    9/2012
EP    2937544 A1    10/2015
(Continued)

OTHER PUBLICATIONS

McMaster-Carr Catalog 114; 200 New Canton Way Robbinsville, NJ 08691-2343, dated 2008, pp. 3434-3438.
(Continued)

*Primary Examiner* — Thu Khanh T. Nguyen
(74) *Attorney, Agent, or Firm* — DAY PITNEY LLP; George N. Chaclas; Anthony A. Kassas

(57) ABSTRACT

In at least some implementations, a method of forming a diaphragm for a liquid pump, includes clamping a substantially planar piece of material about a periphery, and plastically deforming the piece of material inboard of the clamped periphery. In at least some implementations, the material is plastically deformed by pressing a forming member against the material, or the material is plastically deformed by applying a fluid under pressure against the material.

23 Claims, 7 Drawing Sheets

Related U.S. Application Data

(60) Provisional application No. 62/474,136, filed on Mar. 21, 2017, provisional application No. 62/369,541, filed on Aug. 1, 2016.

(51) Int. Cl.
  *F02M 37/12* (2006.01)
  *F04B 43/00* (2006.01)
  *F04B 43/06* (2006.01)
  *F04B 53/06* (2006.01)
  *F02M 17/04* (2006.01)

(52) U.S. Cl.
  CPC .......... *F04B 43/0054* (2013.01); *F04B 53/06* (2013.01); *F02M 17/04* (2013.01)

(56) References Cited

U.S. PATENT DOCUMENTS

| | | | |
|---|---|---|---|
| 3,208,721 | A | 9/1965 | Mchugh |
| 3,834,231 | A | 9/1974 | Hisada |
| 3,911,796 | A | 10/1975 | Hull et al. |
| 4,631,225 | A | 12/1986 | Nishimura |
| 4,842,498 | A | 6/1989 | Bramstedt et al. |
| 4,883,412 | A | 11/1989 | Malizard et al. |
| 5,047,287 | A | 9/1991 | Horiuchi et al. |
| 5,634,391 | A | 6/1997 | Eady |
| 5,907,992 | A | 6/1999 | Huss |
| 5,950,523 | A | 9/1999 | Reynolds |
| 6,173,959 | B1 | 1/2001 | Oikawa et al. |
| 6,338,295 | B1 | 1/2002 | Kubota et al. |
| 6,340,294 | B1 | 1/2002 | Kubota |
| 6,579,074 | B2 | 6/2003 | Chiba |
| 7,311,119 | B2 | 12/2007 | Takehana et al. |
| 7,905,172 | B2 | 3/2011 | Öhrle et al. |
| 9,410,513 | B2 | 8/2016 | Sugiyama et al. |
| 9,567,944 | B2 | 2/2017 | Pattullo et al. |
| 10,662,899 | B2 | 5/2020 | Pattullo |
| 2001/0050040 | A1 | 12/2001 | Shimizu |
| 2002/0094285 | A1 | 7/2002 | Paolini et al. |
| 2004/0177750 | A1* | 9/2004 | Wiechers ............ F04B 43/0054 92/98 R |
| 2004/0239047 | A1 | 12/2004 | Kent et al. |
| 2006/0269425 | A1* | 11/2006 | Hart .................... F04B 43/0009 417/269 |
| 2008/0020178 | A1 | 1/2008 | Öhrle et al. |
| 2012/0204840 | A1 | 8/2012 | Sugiyama et al. |
| 2014/0003983 | A1 | 1/2014 | Roach et al. |
| 2015/0308356 | A1 | 10/2015 | Taniguchi |
| 2016/0175505 | A1 | 6/2016 | Demers et al. |

FOREIGN PATENT DOCUMENTS

| | | |
|---|---|---|
| JP | H0914075 A | 1/1997 |
| JP | H109079 A | 1/1998 |
| JP | H1030514 A | 2/1998 |
| JP | H10220314 A | 8/1998 |
| JP | 2000282994 A | 10/2000 |
| JP | 2001018295 A | 1/2001 |
| JP | 2001123958 A | 5/2001 |
| JP | 2002202026 A | 7/2002 |
| JP | 3467522 B2 | 11/2003 |
| JP | 2006161594 A | 6/2006 |

OTHER PUBLICATIONS

McMaster-Carr Catalog 114; 200 New Canton Way Robbinsville, NJ 08691-2343, dated 2008, p. 3458.
Written Opinion & International Search Report for PCT/US2017/044837 dated Nov. 10, 2017, (21 pages).
CN Office Action for CN Application No. 201780047961.X dated Aug. 4, 2020, (13 pages).
CN Office Action for CN Application No. 201780047961.X dated Mar. 30, 2021, (11 pages).
CN Office Action for CN Application No. 201780047961.X dated Jul. 14, 2021, (11 pages).

* cited by examiner

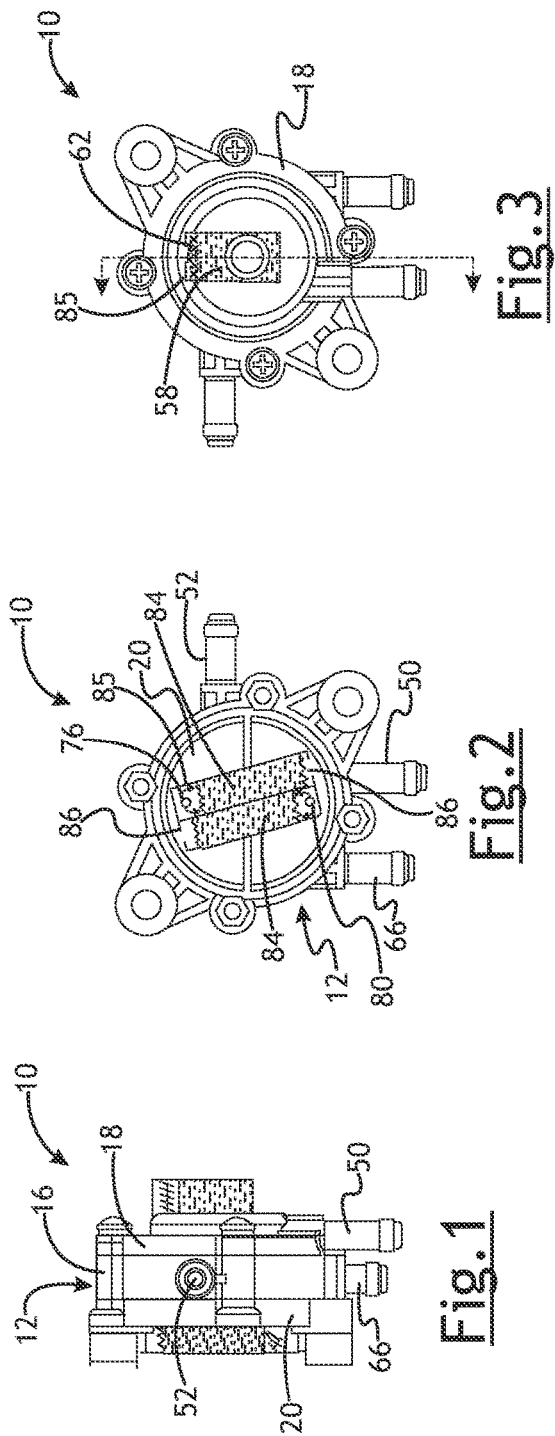
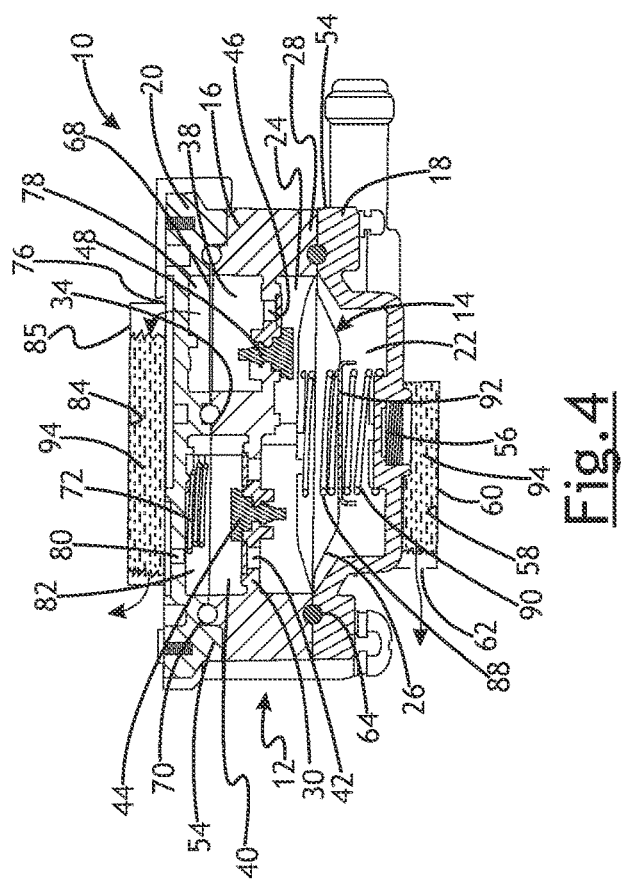

METHOD OF FORMING A DIAPHRAGM FOR A LIQUID PUMP

REFERENCE TO RELATED APPLICATIONS

This application is a divisional of U.S. patent application Ser. No. 16/322,247 filed Jan. 31, 2019, which is a national phase of PCT/US2017/044837 filed Aug. 1, 2017 and claims the benefit of U.S. Provisional Application Ser. No. 62/474,136 filed Mar. 21, 2017 and 62/369,541 filed Aug. 1, 2016. The entire contents of these priority applications are incorporated herein by reference in their entireties.

TECHNICAL FIELD

The present disclosure relates generally to a fluid driven diaphragm pump.

BACKGROUND

Some fluid pumps utilize a diaphragm a portion of which moves in response to a pressure or force differential acting on opposed sides of the diaphragm to draw fluid into the pump and to deliver fluid from the pump under pressure. The pump diaphragm defines a fluid chamber on one side that receives fluid and a second chamber on its other side which may be open to the atmosphere or communicated with a pressure source to provide a desired pressure in the second chamber. Governmental regulations are being promulgated that limit permitted gaseous emissions (e.g. hydrocarbons) and there is a need for a fluid pump that can significantly inhibit such emissions.

SUMMARY

A method of forming a diaphragm for a liquid pump, includes clamping a substantially planar piece of material about a periphery, and plastically deforming the piece of material inboard of the clamped periphery. In at least some implementations, the material is plastically deformed by pressing a forming member against the material, or the material is plastically deformed by applying a fluid under pressure against the material.

In at least some implementations, the step of plastically deforming the piece of material is done to form the piece of material into a non-planar shape that includes a rim and an offset portion located inwardly of the rim. In at least some implementations, the offset portion is frusto-conically shaped. In at least some implementations, the offset portion includes a center region that is at the furthest offset distance from the rim, and the offset portion includes a sidewall extending from the center region. The sidewall may have a maximum diameter adjacent to the rim and a minimum diameter adjacent to the center region. The center region may be flat. And the center region may be formed by a forming member used to plastically deform the material, where the forming member has a flat portion that corresponds to the center region.

In at least some implementations, the material is formed from a polyamide, polyester, fluoropolymer, polyacetal, polyethylene, or alloy or copolymer thereof, or a metal film. In at least some implementations, the material is formed from a semi-crystalline plastic, nylon 6,6, polytetrafluoroethylene (PTFE), fluorinated ethylene propylene (FEP), polyethylene terephthalate (PET), polyoxymethylene (POM), low-density polyethylene (LDPE), or ethylene vinyl alcohol (EVOH). In at least some implementations, the material is formed from stainless steel. In at least some implementations, prior to being plastically deformed, the material has a thickness between 0.02 mm to 0.8 mm.

In at least some implementations, a method of forming a diaphragm for a liquid pump, includes clamping a portion of a circular and planar piece of material, wherein at least an unclamped portion of the material is continuous, without any perforations, and stretching at least a portion of the material that is not clamped until the stretched material plastically deforms, wherein, after stretching, the material remains continuous, without any perforations.

In at least some implementations, the material is clamped at a periphery of the material and the stretched material is located inboard of the periphery. In at least some implementations, the material is one of a polymer or a metal, and the material has a thickness of between 0.02 mm and 0.8 mm. In at least some implementations, the stretching step is accomplished with a forming tool that is pressed into the material. In at least some implementations, the forming tool contacts the material inwardly of the portion of the material that is clamped, and the step of stretching forms the material into a diaphragm having a rim, a center region spaced inwardly from the rim and not planar with the rim, and a sidewall joining the rim with the center region.

In at least some implementations, a diaphragm for a fluid pump includes a first layer formed from a first material that inhibits or prevents vapor permeation through the diaphragm, and a second layer coupled to the first layer and formed from a second material different than the first material. The first material may include at least one of fluoropolymers, perfluoroalkoxy (PFA), polyfluoroethylenepropylene (FEP), polytetrafluoroethylene (PTFE), liquid crystal polymers, nylons, thin metal foil or film, or ethylene vinyl alcohol, and the fluoropolymer may be a fluoroelastomer. The first layer may be continuous and without perforations in an area of the diaphragm adapted to be exposed to a fluid. The first layer may include a base material and a coating that prevents vapor permeation therethrough. The second material may include at least one of NBR rubber, H-NBR, NBR coated or impregnated fiber or nylon materials, or a fluoroelastomer.

In at least some implementations, a third layer may be provided and the first layer may be received between the second and third layer. The third layer may be formed from the second material. The second layer and third layer may both be overmolded on the first layer. The first layer may be fully encapsulated between the second and third layer. The second and third layers may each include a first portion adapted to be trapped between opposed bodies and the second and third layers may each also include a second portion inboard of the first portion and wherein the first layer is fully encapsulated between the second portions of the second and third layers.

In at least some implementations, a fluid pump includes a housing having a vent opening, a diaphragm carried by the housing and defining with the housing a fluid chamber for receipt of a fluid, wherein the fuel chamber is on one side of the diaphragm and the vent opening is on the other side of the diaphragm such that liquid fuel does not flow through the vent opening, and a vent chamber communicated with the vent opening and including a vapor filter, the vapor chamber and vapor filter being arranged so that fluid flowing out of the vapor vent flows through the vapor filter. The vapor filter may include charcoal such as activated charcoal to adsorb hydrocarbons. The housing may include multiple vent openings and each vent opening may be communicated with one or more than one vapor filter.

In at least some implementations, the vent chamber is longer than it is wide and the vapor filter is also longer than it is wide. The vapor filter may fill the volume of at least part of the vent chamber so that vapor must flow into the vapor filter and cannot flow around the vapor filter. The vent chamber may be more than 3 times as long as it is wide, and the vent chamber may have more than one change of direction and may be circuitous.

In at least some implementations, a diaphragm for a fluid pump includes a planar rim and a center region inboard of the rim, and multiple retention features formed in the rim. The retention features may include voids formed through the rim and circumferentially spaced apart about the rim.

In at least some implementations, a method of forming a diaphragm for a fluid pump includes clamping a substantially planar piece of material about a periphery, and plastically deforming the piece of material inboard of the clamped periphery. The material may be deformed by pressing a forming member against the material, and/or the material may be deformed by applying a fluid under pressure against the material.

The various features and components noted above may be used in any suitable combination, as can the various method and process steps, as supported in this and the other sections of this specification including the drawings.

BRIEF DESCRIPTION OF THE DRAWINGS

The following detailed description of certain embodiments and best mode will be set forth with reference to the accompanying drawings, in which:

FIG. 1 is a side view of a fluid driven pump;

FIG. 2 is a bottom view of the pump of FIG. 1;

FIG. 3 is a top view of the pump;

FIG. 4 is a cross-sectional view of the pump taking generally along line 4-4 in FIG. 3;

DETAILED DESCRIPTION

Figure 6:
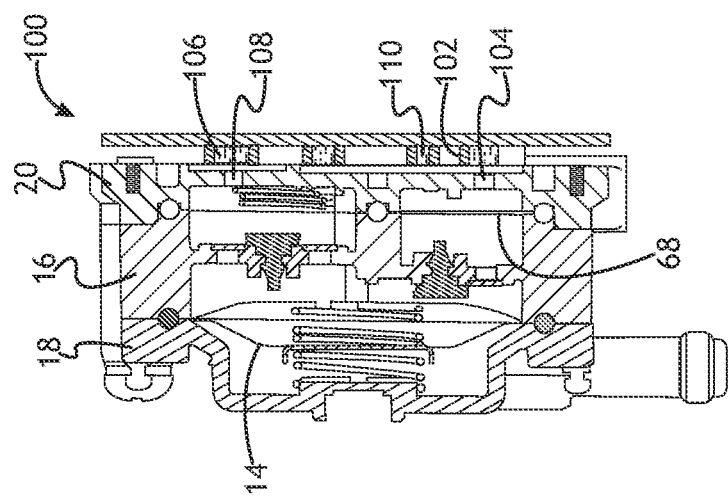
FIG. 6 is a cross-sectional view of the pump of FIG. 5.

Referring in more detail to the drawings, FIGS. 1-4 illustrate a fluid driven diaphragm pump 10 that may be used, for example, to pump fuel from one location to another in a fuel system. In at least one implementation, the pump 10 takes in fuel from a fuel tank and pumps the fuel to a carburetor or throttle body. In the carburetor or throttle body, the fuel is mixed with air and the fuel and air mixture is then delivered to an engine to support combustion in the engine. While the pump 10 is described herein with regard to pumping fuel, it may be used to pump other fluids.

The pump 10 includes a housing 12 and at least one pump diaphragm 14 (FIG. 4) carried by the housing and having a portion movable relative to the housing to create a pumping action as is generally known in the art. The housing 12 may include a main body 16 and one or more covers with a first cover 18 and a second cover 20 shown in the illustrated example. The diaphragm 14 may be a generally thin sheet of material that is flexible, and, as shown in FIG. 4, the diaphragm may be trapped about its periphery between the main body 16 and first cover 18. So arranged, a pressure chamber 22 is defined between one side of the diaphragm 14 and the first cover 18, and a fuel chamber 24 is defined between the opposite side of the diaphragm 14 and the main body 16. The diaphragm 14 may be generally planar and suitably elastic to permit movement of at least part of the diaphragm not trapped between the main body 16 and the first cover 18, or the diaphragm may include one or more non-planar features, such as pleats, folds, bends, curved or convoluted portions 26 or other features that facilitate flexing or movement of the untrapped portion of the diaphragm relative to the pressure and fuel chambers 22, 24. The diaphragm 14 may be formed of any material suitable for use in the fluid being pumped (e.g. fuel). Some representative but not limiting examples include NBR rubber (i.e. acrylonitrile butadiene rubber), NBR coated or impregnated fiber or nylon materials, polymeric films and thin metal foil or film.

The main body 16 may include a circumferentially continuous and axially extending peripheral skirt or wall 28 adapted to overlie and in assembly trap the diaphragm 14 as noted above. An intermediate wall 30 may have a side facing the diaphragm 14 and arranged to define part of the fuel chamber 24. A divider 34 may extend from an opposite side of the intermediate wall 30. The divider 34 and opposite side may each define part of an inlet chamber 38 into which fuel enters the pump 10 and an outlet chamber 40 from which fuel is discharged from the pump. A first passage or port 46 may be provided in the intermediate wall 30 to communicate the inlet chamber 38 with the fuel chamber 24. An inlet check valve 48 may be associated with the first port 46 to permit fuel flow from the inlet chamber 38 to the fuel chamber 24 and to prevent the reverse flow. Similarly, a second passage or port 42 may be provided in the intermediate wall 30 to communicate the fuel chamber 24 with the outlet chamber 40. An outlet check valve 44 may be associated with the second port 42 to permit fuel flow from the fuel chamber 24 to the outlet chamber 40 and to prevent the reverse flow. The main body 16 may include a fuel inlet 66 through which fuel from a fuel tank (or other fluid from a fluid source) may flow into inlet chamber 38. The main body 16 may further include a fuel outlet 52 through which fuel discharged from the outlet chamber 40 flows. The fuel inlet 66 and fuel outlet 52 may include or comprise fittings adapted to receive a hose, tube or fluid connector to facilitate routing fuel to and from the pump 10.

The first cover 18 may include a peripheral rim 54 adapted to be received adjacent to the peripheral wall 28 of the main body 16 with the periphery of the diaphragm 14 trapped between the rim 54 and wall 28. So arranged, the pressure chamber 22 is defined between the first cover 18 and the diaphragm 14. A vent opening 56 formed in the cover 18 communicates the pressure chamber 22 with a vent chamber 58 that is defined in an enclosure defined by a chamber wall 60 and the cover 18 on the opposite side of the cover as the pressure chamber 22. The vent chamber 58 includes a port 62 leading to the atmosphere and atmospheric air flows through the vent chamber before flowing into the pressure chamber 22 through the vent opening 56. Likewise, air in the pressure chamber 22 flows through the vent 56 and then the vent chamber 58 before reaching the atmosphere. The cover 18 may have any desired shape, may be formed of any desired material, and may be coupled or connected to the main body 16 in any desired manner. One or more gaskets or seals 64 may be received between the diaphragm 14 and one or both of the first cover 18 and main body 16 to provide a fluid tight seal between them, as desired. The first cover 18 may also include a pressure inlet 50 that communicates a pressure source with the pressure chamber 22 to vary the pressure in the pressure chamber as will be set forth below.

In at least some implementations such as that shown in FIGS. 1-4, the pump 10 may include a second diaphragm 68. Hereafter, the diaphragm 14 described above will hereafter be referred to as the first diaphragm 14 to avoid confusion with the second diaphragm 68.

The second diaphragm 68 may be carried by the housing 12 to define part of the inlet chamber 38 and the outlet chamber 40. In the example shown, the second diaphragm 68 is a generally flat and somewhat flexible sheet of material that has its periphery trapped between the main body 16 and the second cover 20 carried by or coupled to the main body. The second diaphragm 68 may also be trapped between the divider 34 and the second cover 20, and a gasket or other seal 70 may be provided between the second diaphragm and one or both of the main body 16 and second cover 20 to provide a fluid tight seal between them, as desired. In this way, the inlet and outlet chambers 38, 40 are fluid tight and defined between the second cover 20, the divider 34 and the main body 16. If desired, a spring 72 or other biasing member may be received between the second cover 20 and second diaphragm 68 opposite to and overlying the outlet chamber 40. The spring 72 biases the portion of the second diaphragm 68 that is exposed to the outlet chamber 40 toward the outlet chamber. When fuel under pressure is provided under pressure into the outlet chamber 40, the spring 72 may be compressed, and may subsequently provide a force on the fuel through the second diaphragm 68 to increase the outlet pressure of fuel discharged from the fuel outlet 52.

The second cover 20 may include one or more vent openings. A first vent opening 76 formed in the second cover 20 communicates with a first space 78 between the second diaphragm 68 and the second cover 20 and overlying the inlet chamber 38. A second vent opening 80 formed in the second cover 20 communicates with a second space 82 between the second diaphragm 68 and the second cover 20 and overlying the outlet chamber 40 (e.g. the space in which the spring 72 is received). The first and second vent openings 76, 80 each communicate with a separate second vent chamber 84 and the chambers 84 are defined between an enclosure or wall 85 and the second cover 20 on the opposite side of the second cover as the second diaphragm 68. The second vent chambers 84 include a port 86 leading to the atmosphere and the first space 78 and second space 82 communicate with the atmosphere through the vent openings 76, 80 and second vent chambers 84. The second cover 20 may have any desired shape, may be formed of any desired material, and may be coupled or connected to the main body 16 in any desired manner. Instead of two separate vent chambers 84, the vent openings 76, 80 could both lead to a single vent chamber.

In at least some implementations, the pump 10 uses a pressure differential produced by an engine with which the pump is used to move the exposed portion of the first diaphragm 14 relative to the fuel chamber 24. This pressure differential is generally transferred via a pulse tube to the pressure chamber 24 through the pressure inlet 50. In a two-stroke engine the pressure inlet 50 is connected to or communicated with the engine crankcase. Movement of an engine piston creates positive and negative pressure pulses that are communicated with the first diaphragm 14 to move it relative to the fuel chamber 24. As the first diaphragm 14 moves toward the first cover 18, the volume of the fuel chamber 24 increases, a pressure drop exists across the inlet valve 48 which opens to permit fuel in the inlet chamber 38 to enter the fuel chamber 24. Then, when the engine pressure signal changes to a positive, superatmospheric pressure (or just pressure greater than before, which could be atmospheric), the first diaphragm 14 is displaced away from the first cover 18. This decreases the volume of the fuel chamber 24 and pushes the fuel through the outlet valve 44 and into the outlet chamber 40. Fuel in the outlet chamber 40 may exit the pump 10 through the fuel outlet 52, and the flow of fuel into the outlet chamber 40 may also displace the associated portion of the second diaphragm 68 and compress the spring 72. Then, when the pressure in the outlet chamber 40 reduces, the spring 72 may decompress and apply a force on the fuel through the second diaphragm 68 to assist in the discharge of fuel from the outlet chamber 40. The alternating pressure signal from the engine oscillates the exposed portion of the first diaphragm 14 and thereby takes fuel into the fuel chamber 24 and discharges fuel from the fuel chamber as noted above.

In at least some engine applications, the pressure differential may be between about 0.5 psi and 15 psi. This pressure differential may be transferred generally directly to the first diaphragm 14 and fuel pressures from the pump 10 may be nearly the same as the pressure differential of the crankcase. In some four-stroke engines, the engine crankcase contains lubricating oil. Therefore, the pressure inlet 50 is connected to or communicated with the engine intake manifold instead (although many four-stroke engines use crankcase pressure signals). As the engine piston ascends and descends, the pressure in the intake manifold transitions between approximately atmospheric pressure and a negative pressure. This pressure differential is usually less than in a two-stroke engine (e.g. about 2 psi). Because of this lower pressure differential, a spring may be added to act on the first diaphragm 14 and move the first diaphragm when the negative pressure signal returns to approximately atmospheric pressure.

Some engines may provide a negative biased or more negative pressure signal, and to offset this or otherwise control the movement of the first diaphragm 14 as desired, one or more biasing members may be provided acting on the first diaphragm. In the example shown, one spring 88 is provided in the fuel chamber 24 between the main body 16 and the first diaphragm 14 and a second spring 90 is provided in the pressure chamber 22 between the first cover 18 and first diaphragm 14. The springs 88, 90 provide opposing forces on the first diaphragm 14. The springs 88, 90 may also reduce the affect of the engine pressure on the first diaphragm 14 and assist movement of the diaphragm to provide more consistent operation of the pump 10. To avoid damage to the first diaphragm 14, spring retainers or spacers 92 may be provided between the springs 88, 90 and the first diaphragm 14, as desired. The retainers or spacers 92 may be fixed to the first diaphragm 14 (e.g. by adhesion, weld or otherwise) or simply trapped against the diaphragm.

Gasseous matter, such as hydrocarbon fuel vapor from the fuel in the fuel chamber 24, inlet chamber 38 and outlet chamber 40 may permeate through the diaphragms 14, 68 and escape to the atmosphere through the vent openings 56, 76, 80. Emission to the atmosphere of at least certain vapors, or certain emission rates of vapors, may be undesirable. To reduce the emission to the atmosphere of such vapors, one or both/all vent chambers 58, 84 may include a filter 94 designed to reduce vapor emissions. In at least one implementation, the filter 94 includes activated charcoal or the like which is known to adsorb hydrocarbon vapors. Hence, the outflow of gasses from the pressure chamber 22, and first and second spaces 78, 82, may be restricted to flow through a filter 94. And the inflow of air from the atmosphere into those chambers likewise occurs through the filter 94. And desorption of gasses during the inflow of air simply moves the vapors into the chambers and does not discharge the vapors to the atmosphere. Hence, the emission of vapor to the atmosphere is reduced. The filters 94 may be carried by the pump housing 12, or they may be remotely located in which case the vent openings would lead to remote vent chambers 58, 84 via a tube, passage or other conduit.

The vent chambers 58, 84 may be longer than they are wide to provide a relatively narrow space in which the filter material is contained and through which the gasses flow, so that the vapors are forced to engage more of the filter material before reaching the chamber port 62, 86 and the atmosphere. The vapor filter may also be longer than it is wide and the vapor filter may fill the volume of the vent chamber (i.e. engage the surfaces defining the vent chamber in a cross-section of the vent chamber) so that vapor must flow into the vapor filter and cannot flow around the vapor filter. This increases the likelihood that vapors will be adsorbed by the filter material and hence, increases the efficiency of the filter 94.

Figure 5:
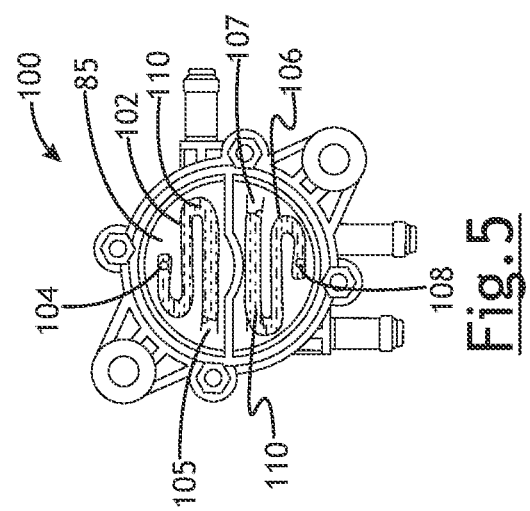
FIG. 5 is a bottom view of the pump with an alternate vent cavity.

In this regard, FIGS. 5 and 6 illustrate another implementation of a pump 100 that, includes one circuitous vent chamber 102 for the first vent opening 104 and a second circuitous vent chamber 106 for the second vent opening 108 (these may both be called second vent chambers, or they may collectively define a single second vent chamber). These vent chambers 102, 106 may be separate or they may be communicated with each other (such as by a cross passage), as desired. Both vent chambers 102, 106 may be of similar shape and construction, or they could be different, as desired. In the version shown, the vent chambers 102, 106 have a circuitous interior chamber that is filled with a filter 110 or filter material and that terminates at a port 105, 107. The circuitous path provides a chamber 102, 106 that is more than three times as long as it is wide, and in some implementations is 8 or more times as long as it is wide, where the length is measured along a center of the circuitous chamber and the width is the average width between the walls 112 that define the circuitous chamber taken generally perpendicular to the direction of gas flow in the chamber. A similar chamber or chambers may be provided for the first vent chamber 58, if desired. Also, while separate vent chambers 58, 102, 106 are shown for each vent opening 56, 104, 108, all vent openings may all communicate with a single chamber (e.g. through tubes, passages or other conduits), or with more than two chambers, as desired. Further, an alternate second vent chamber may overlie or define at least 75% and up to the entire outer surface of the second cover 20 and may be filled with filter material to provide an increased amount of filter material. In at least some implementations, the vent chamber port 105, 107 is at one end of the vent chamber 102, 106 and the vent openings 104, 108 are at the other end of the vent chamber so that gasses must flow through the entire length (or at least 75% of the length) of the vent chamber from the chamber ports 105, 107 to the vent openings 104, 108.

As noted above, the first diaphragm 14 and the second diaphragm 68 may be generally planar, or they may have features to facilitate movement of exposed areas of the diaphragms for increased movement of those areas in use. In one form, as shown in FIGS. 7-10, a flat, planar piece of diaphragm material 150 (FIG. 7) is formed into a diaphragm 152 (FIGS. 9 and 10) with an offset, non-planar and generally frustoconical pump portion 154 by stretching or otherwise forming the flat sheet 150 so that at least some of the pump portion 154 of the diaphragm 152 (e.g. the portion exposed within the pump in assembly) is offset from a peripheral rim 156 portion of the diaphragm. The diaphragm may be formed from any suitable material such as polyamides, polyesters, fluoropolymers, polyacetals, polyethylenes, or alloys or copolymers thereof, and thin metal films or sheets such as stainless steel. Some more specific examples include, semi-crystalline plastics, nylon 6,6, polytetrafluoroethylene (PTFE), fluorinated ethylene propylene (FEP), polyethylene terephthalate (PET) (e.g., Mylar by Dupont), polyoxymethylene (POM), low-density polyethylene (LDPE), or ethylene vinyl alcohol (EVOH). Polymeric materials may optionally include fillers or modifiers such as colorants, stabilizers, reinforcements, electrical conductors, etc. The diaphragm 152 may have a thickness between about 0.02 mm to 0.8 mm.

The frustoconical shape of the example diaphragm 152 includes a generally flat center region 158 that is at the farthest offset distance from the rim 156, and a tapered sidewall 160 that extends from a maximum diameter adjacent to the rim 156 to a minimum diameter at the center region 158. The flat center region 158 may facilitate use of a spring with the diaphragm 152 after the diaphragm is formed. Of course, other shapes and configurations may be used. For example, folds, bends or other non-planar features may be provided in the diaphragm 152 by the stretching or other formation methods. The non-planar regions facilitate flexing and movement of the portion of the diaphragm 152 exposed to the pressure/force differential to improve the pumping action of the diaphragm.

In one form, the sheet of material is trapped about its periphery between opposed clamps 160 and a central forming member 162 is pressed into the unclamped and exposed center of the sheet 150 and advanced until the material stretches and plastically deforms, without rupturing. In the example shown, the forming member 162 is a round disc having a diameter less than an interior diameter of the clamps 160 and adapted to define the flat center region 158 in the formed diaphragm 152. The plastically formed material retains at least some of the non-planar shape achieved during the forming process (i.e. there may also be some elastic deformation and the material may resiliently return at least partly toward its planar and unformed condition). In addition to or instead of the forming member, a fluid pressure (gas or liquid or both) may be applied to a portion of the diaphragm to be stretched or otherwise deformed out of its planar and unformed condition.

Figure 7:
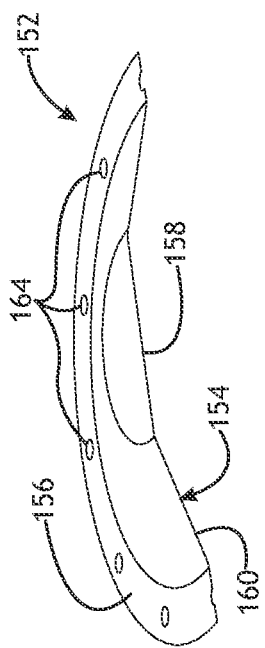
FIG. 7 is a perspective view of a sheet of material for a diaphragm.
Figure 8:
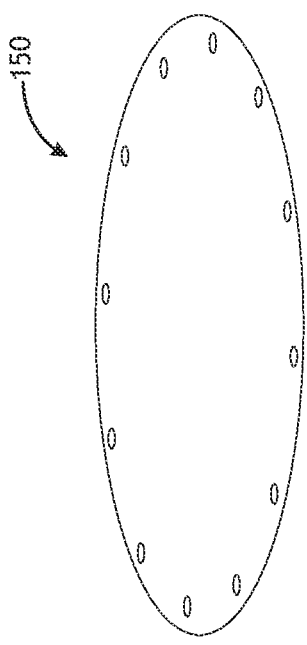
FIG. 8 is a perspective sectional view of part of a forming mechanism for forming a diaphragm from the material of FIG. 7.
Figure 9:
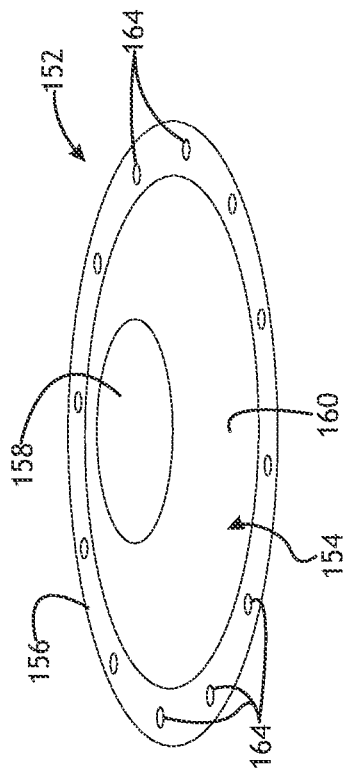
FIG. 9 is a perspective sectional view of a formed diaphragm.
Figure 10:
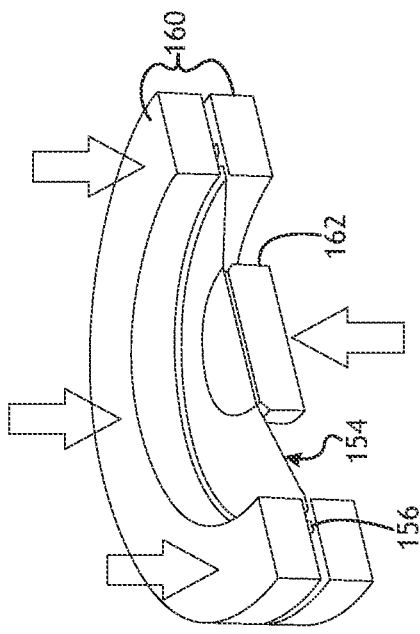
FIG. 10 is a perspective view of the formed diaphragm.
Figure 11:
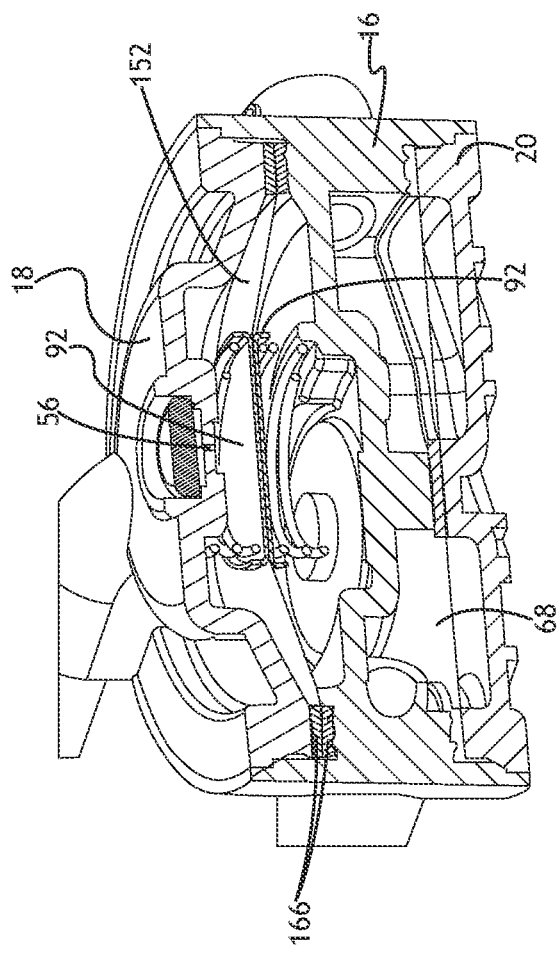
FIG. 11 is a sectional view of a pump.
Figure 12:
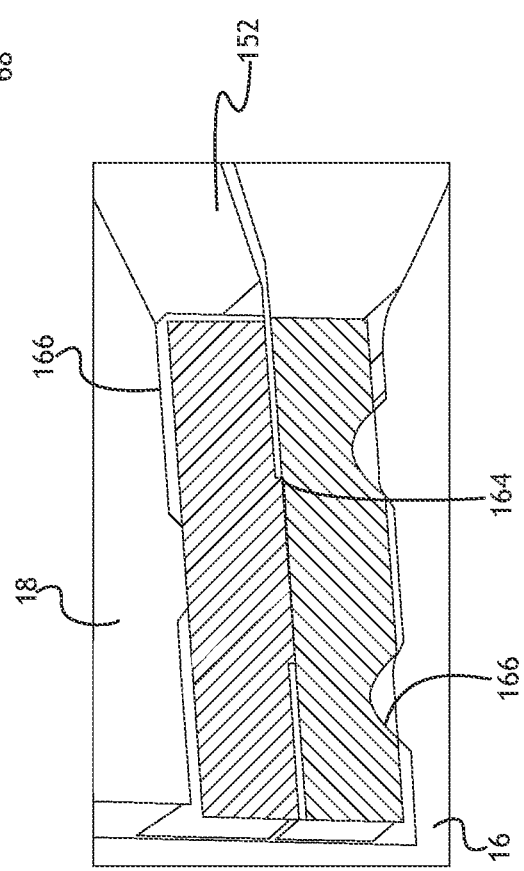
FIG. 12 is an enlarged view of the encircled portion of FIG. 11.

Prior diaphragms often included an enlarged bead at the periphery of the diaphragm. The bead was received within a circular channel in one or both of the cover and main body of the pump housing to retain the position of the diaphragm relative to the housing in use of the pump. With a diaphragm 152 having a flat rim 156 adapted to be trapped between the main body 16 and a cover 18, as shown in FIGS. 7-12, there is no bead or other non-planar retention feature. Accordingly, the diaphragm 152 set forth herein, which may be entirely planar as shown in FIG. 7 or include at least one non-planar portion 154 as shown in FIGS. 8-12, may include retention features 164 within the planar rim 156. In the example shown, the retention features are defined by voids 164 formed in the rim 156. The voids 164 do not increase the thickness or render the rim 156 non-planar. Instead, as shown in FIG. 12, the voids 164 provide an open area into which a gasket or seal 166 may protrude in assembly, when the cover 18 and main body 16 are connected together with the gasket/seal 166 and diaphragm 152 trapped between them. This mechanically interconnects or interlocks the diaphragm 152 with the gasket or seal 166, and the position of the diaphragm 152 may be maintained in use of the pump. In the implementation shown in FIGS. 11 and 12, a pair of gaskets 166 are used, with a gasket on each side of the rim 156. In this arrangement, the gaskets 166 may engage each other through the voids 164, providing improved retention of the diaphragm 152 relative to the gaskets 166. A plurality of voids 164 may be provided spaced apart circumferentially about the rim 156, as desired. Further, the voids 164 may have any desired shape and size. In the example shown, the voids 164 are circular and of uniform spacing and uniform size, but these details are not required and may be changed as desired.

Figure 13:
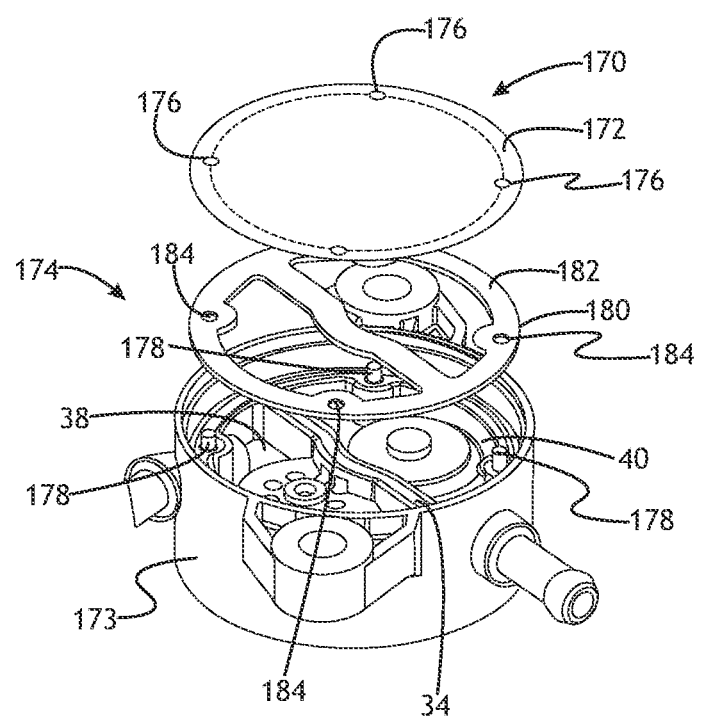
FIG. 13 is an exploded view of a portion of a pump showing a diaphragm, gasket and part of a pump housing.

FIG. 13 illustrates another example of a diaphragm 170 including a generally planar rim 172 to be trapped between a main body 173 and a cover (not shown) of a pump 174. The diaphragm 170 may be either planar or non-planar, as desired. The example shown is the second diaphragm (corresponding to diaphragm 68 in FIGS. 1-4), which spans or covers the inlet chamber 38 and outlet chamber 40, as well as the divider 34, although the concepts discussed herein could also be applied to the first diaphragm 14. Voids 176 are provided in the rim 172 and are of a size, shape and location to receive locator tabs or pins 178 extending from the main body 16, cover 18 or both. The position of the diaphragm 170 is then retained relative to the main body 173 in assembly. Further, a gasket 180 may be trapped between the diaphragm 170 and the main body 173, cover or both. The gasket 180 may also include a peripheral rim 182 and one or more voids 184 may be formed in the rim 182 and be of a size, shape and location to receive a locator tab or pin 178 to retain the position of the gasket 180. The gasket 180 and the diaphragm 170 may be separate components which facilitates the manufacture of each of them. The diaphragm 170 and gasket 180 may be combined together before assembly (e.g. by an adhesive, weld, connector or the like), or they may be separately installed into the pump 174, as desired. Some prior diaphragms formed from thin film polymers were overmolded with a rubber gasket but it was found to be difficult to cure the rubber gasket without damaging or changing the properties of the film, it was difficult to form the rubber gasket without burrs or other imperfections than can affect the performance of the gasket and diaphragm, and burrs or pieces of the gasket may come loose in the pump.

Figure 14:
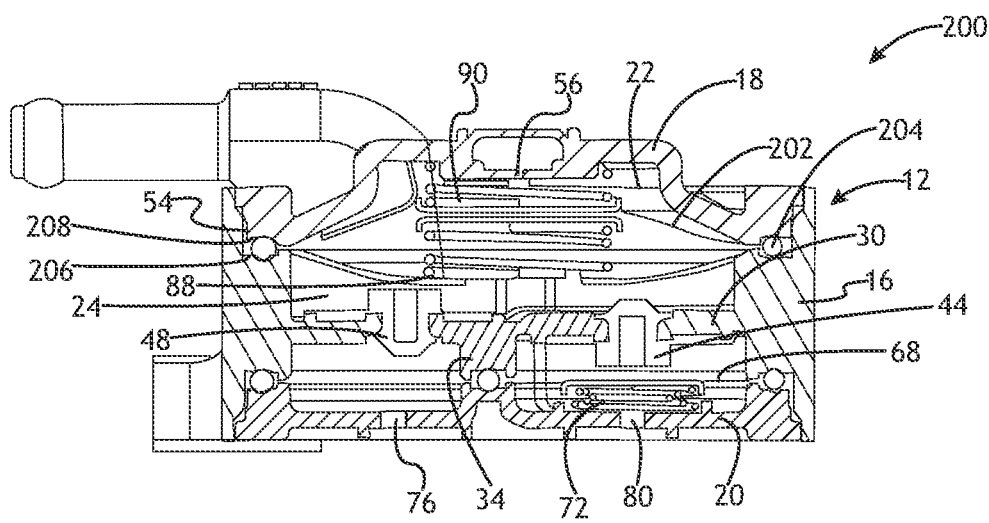
FIG. 14 is a cross-sectional view of a pump including a first diaphragm.

FIG. 14 illustrates a diaphragm pump 200 that may be similar in many aspects to the previously described pumps, and to facilitate description of this pump, similar components have been given the same reference numbers used in description of the other pumps. For example, the pump may include a housing 12 with a main body 16, a first cover 18, a second cover 20, and a first diaphragm 202 trapped about its periphery between the main body 16 and first cover 18, and a second diaphragm 68 trapped about its periphery between the main body 16 and second cover 20. The first and second covers 18, 20 may be coupled to the main body 16 in any suitable way, such as by fasteners or welding the bodies together.

Figure 15:
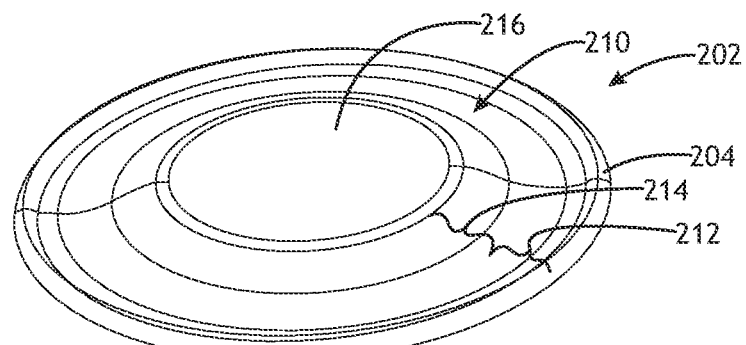
FIG. 15 is a plan view of the first diaphragm.
Figure 16:
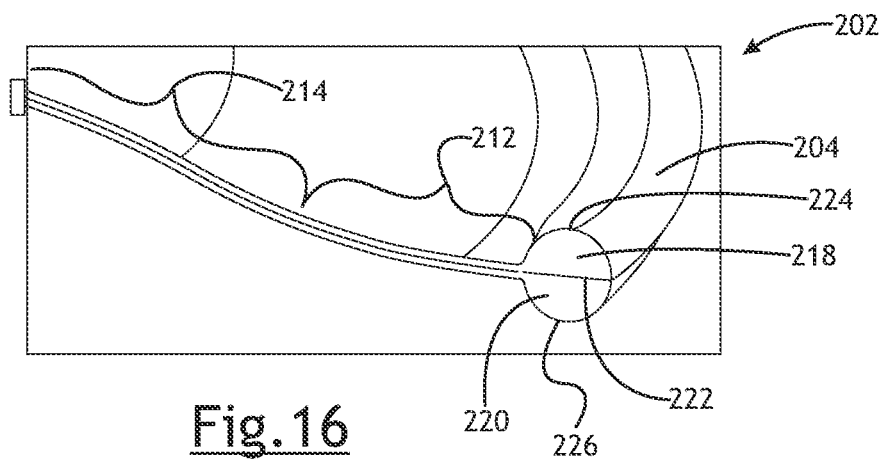
FIG. 16 is an enlarged cross-sectional view of a portion of the first diaphragm illustrating a multi-layer construction.

As shown in FIGS. 15 and 16, the first diaphragm 202 may include a bead 204 at or adjacent to its periphery. The bead 204 may be circumferentially continuous and of any desired cross-sectional shape, such as circular or elliptical, although other shapes may be used and the bead need not have a constant shape about its circumferential length. The bead 204 may be adapted to be received between opposed surfaces 206, 208 of the main body 16 and first cover 18. One or both of the opposed surfaces 206, 208 of the first cover and main body may include annular channels, indentations or other features designed to increase the surface area of contact between the first diaphragm bead 204 and the main body 16 and first cover 18 to provide improved retention of the first diaphragm 202 and to provide an improved seal between the bodies 16, 18 and 202.

A sidewall 210 of the diaphragm 202 extends radially inwardly from the bead 204. The sidewall 210 may be contoured as desired to provide a desired flexibility of the diaphragm 202 and/or permit a desired range of movement of the untrapped portion of the diaphragm (which is the portion not trapped between the first cover 18 and main body 16) relative to the trapped portion. In the implementation shown, and when viewed from the top side of the diaphragm 202 as shown in FIG. 15, the sidewall 210 includes a flat or concave first portion 212 that is coupled to the bead 204 and which leads to a convex inner or second portion 214 providing a generally sinuous or 's-shaped' sidewall. The second portion 214 may be generally frustoconical or otherwise shaped, and may lead to a central portion 216. The central portion 216 may be generally planar, if desired, to provide a flat surface against which one or more springs 88, 90 may act, as previously described.

The first diaphragm 202 may include or be formed from multiple layers of material, and at least two layers may be formed from different materials. In at least some implementations, including the example shown in FIG. 16, the diaphragm may include more than two layers. As shown in FIG. 16, the diaphragm includes three layers with two outer layers 218, 220 and a middle layer 222 between the outer layers. At least one of the layers 218-222 may be formed from a material that inhibits fuel vapor permeation therethrough, to inhibit or prevent fuel vapor permeation through the first diaphragm. In the example shown, the middle layer 222 is formed from a fuel vapor barrier material. Representative but not limiting examples of fuel vapor barrier materials include, fluoropolymers (including but not limited to perfluoroalkoxy (PFA), polyfluoroethylenepropylene (FEP), polytetrafluoroethylene (PTFE)), liquid crystal polymers, nylons, polymeric films, thin metal foil or film, and ethylene vinyl alcohol.

The outer layers 218, 220 may be formed from any desired material which may be chosen, for example, to resist degradation in liquid fuel (at least for the side exposed to the fuel chamber), to resist degradation due to abrasion or contact with the first cover 18 or main body 16, to resist degradation due to contact with the spring(s) or retainers for the springs, to facilitate movement of the untrapped portion of the diaphragm, to facilitate formation of the diaphragm and/or to reduce the cost of the diaphragm. Some representative but not limiting examples of materials for the outer layers include NBR rubber (i.e. acrylonitrile butadiene rubber), H-NBR, NBR coated or impregnated fiber or nylon materials, or various fluoroelastomers. In one implementation, the outer layers 218, 220 are formed of NBR and the middle layer 222 is formed from PFA.

In at least some implementations, the middle layer 222 may be fully encapsulated by the outer layers 218, 220, at least in the untrapped area of the diaphragm 202. Further, opposed sides or surfaces 224, 226 of the bead 204 may be defined by the material of the outer layers to facilitate sealing engagement with the first cover 18 and main body 16. The outer layers 218, 220 may be adhered to the inner layer 222 or the inner layer may be overmolded by the material defining the outer layers. With some materials, bonding of the inner and outer layers 218-222 can be problematic so an adhesive may be used even when the inner layer 222 is overmolded with the material of the outer layers 218, 220. While described above with regard to the first diaphragm 202, the second diaphragm 68 may be formed in a similar manner.

Figure 17:
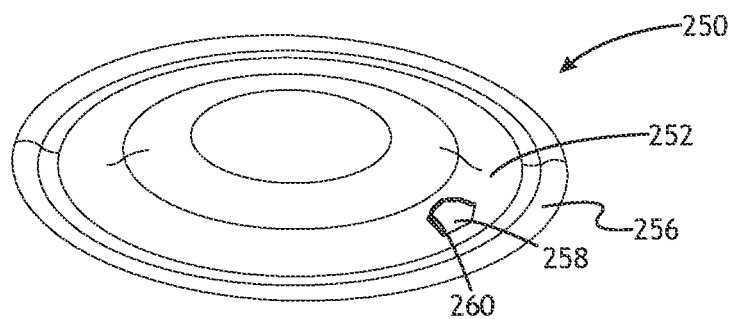
FIG. 17 is a perspective view showing one side of a multi-layer diaphragm.
Figure 18:
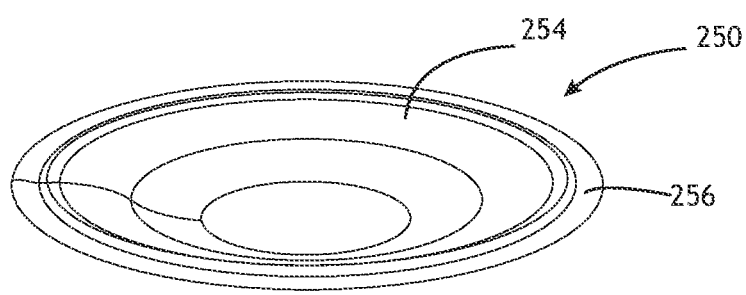
FIG. 18 is a perspective view showing the other side of the diaphragm of FIG. 17.

FIGS. 17 and 18 illustrate an alternate diaphragm 250 having more than one layer and which may have any desired shape, including that described above with regard to diaphragm 202. As shown, the diaphragm 250 includes two layers, each formed of a different material. A first layer 252 may be formed from a material described above with regard to the outer layers 218, 220, and the second layer 254 may be formed from a material described above with regard to the inner layer 222. In at least some implementations, when the diaphragm 250 is installed in a pump, the second layer 254 is exposed to liquid fuel in the fuel chamber 24 and the first layer 252 is exposed to the pressure chamber 22. Of course, the opposite could be true if desired. At least the second layer 254 inhibits or prevents fuel vapor from permeating through the diaphragm 250. The second layer 254 may be continuous, that is, without voids, to provide a continuous barrier against fuel vapor permeation. And the second layer may span the entirety of at least the untrapped portion of the diaphragm 250. In at least some implementations, the second layer 254 is trapped between the first layer 252 and either the main body 16 or first cover 18 (depending upon the orientation of the diaphragm 250 within the pump). A periphery of the second layer 254 may instead be embedded within a bead 256 which, in some implementations, may be formed from the material of the first layer 252 so that the bead is trapped between the first cover 18 and main body 16 to seal the diaphragm 250 to the first cover and main body. Alternatively, as shown in FIGS. 17 and 18, the bead 256 can be formed by the material of both layers 252, 254. Of course, one or more gaskets may also be used between the diaphragm 250 and the first cover 18 and/or main body 16, if desired. In applications where a sufficient seal is achieved with the diaphragm alone, without any gaskets, the part count is reduced and handling and assembly of the components is facilitated.

Instead or in addition to the configurations and constructions noted herein, in a single layer or multiple layer diaphragm, one or both sides of the diaphragm may include a base material 258 (shown in a broken away portion of FIG. 17) or layer that is coated with a material or substance to inhibit fuel vapor permeation through the diaphragm. In at least some implementations, at least part of the diaphragm may be covered with a fluorine coating 260 (FIG. 17). In the example of a two-layer diaphragm as in FIGS. 17 and 18, the entire diaphragm or only the first layer of the diaphragm may be coated. Alternatively, the diaphragm may be formed from or include a fluoroelastomer like FKM, FFKM or FEPM.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention. For example, while the vent chamber ports were noted as communicating with the atmosphere, they may communicate with any ambient or outside chamber, where outside is taken to mean some space not internal to the pump.

The invention claimed is:

1. A method of forming a diaphragm for a liquid pump, comprising:
   securing a substantially planar piece of material, about a periphery thereof, between a set of opposed clamps;
   plastically deforming the piece of material inboard of the clamped periphery by applying a fluid under pressure against the material to cause the piece of material to stretch beyond an elastic limit and retain an offset non-planar shape after removal of the fluid pressure; and
   assembling the plastically deformed diaphragm into a pump housing of the liquid pump such that the diaphragm separates a liquid fuel chamber from a pressure chamber and is operable, in response to pressure differentials, to vary the volume of the liquid fuel chamber to pump liquid through an inlet valve and an outlet valve.

2. The method of claim 1, wherein the step of plastically deforming the piece of material is done by forming the piece of material into a non-planar shape that includes a rim and an offset portion located inwardly of the rim.

3. The method of claim 2, wherein the offset portion is formed into a frustro-conical shape.

4. The method of claim 2, wherein the offset portion frustro-conical shape includes a center region that is at a furthest offset distance from the rim, and the offset portion includes a tapered sidewall extending from the center region.

5. The method of claim 4, wherein the tapered sidewall has a maximum diameter adjacent to the rim and a minimum diameter adjacent to the center region.

6. The method of claim 4, wherein the center region is formed by the fluid under pressure into a flat shape.

7. The method of claim 1, wherein the material is formed from a polyamide, polyester, fluoropolymer, polyacetal, polyethylene, or an alloy or copolymer thereof.

8. The method of claim 1, wherein the material is formed from a semi-crystalline plastic, nylon 6,6, polytetrafluoroethylene (PTFE), fluorinated ethylene propylene (FEP), polyethylene terephthalate (PET), polyoxymethylene (POM), low-density polyethylene (LDPE), or ethylene vinyl alcohol (EVOH).

9. The method of claim 1, wherein the material is formed from stainless steel.

10. The method of claim 1, wherein, prior to being plastically deformed, the material has a thickness between 0.2 mm to 0.8 mm.

11. The method of claim 1, wherein the material is formed from perfluoroalkoxy (PFA), polyfluoroethylenepropylene (FEP), or polytetrafluoroethylene (PTFE).

12. The method of claim 1, wherein plastically deforming comprises stretching the piece of material until the material yields plastically while remaining continuous and free of perforations.

13. The method of claim 1, further comprising forming voids in a rim portion of the plastically deformed diaphragm, the voids receiving gasket material in assembly to interlock the diaphragm with the pump housing.

14. The method of claim 1, wherein assembling the diaphragm into the pump housing further comprises trapping the diaphragm periphery between the pump housing and a cover with a gasket that engages the diaphragm through the voids.

15. The method of claim 1, wherein plastically deforming forms the diaphragm with a bead at its periphery adapted to be seated between opposed annular surfaces of the pump housing to seal the liquid fuel chamber.

16. A method of forming a diaphragm for a liquid pump, comprising:
   securing a substantially planar piece of material, about a periphery thereof, through a plurality of apertures between a set of opposed clamps;
   plastically deforming the piece of material inboard of the clamped periphery by applying a fluid under pressure against the material to cause the piece of material to stretch beyond an elastic limit and retain an offset non-planar shape;
   assembling the plastically deformed diaphragm into a pump housing of the liquid pump to separate a liquid fuel chamber from a pressure chamber; and
   in response to pressure differentials, varying the volume of the liquid fuel chamber with the plastically deformed diaphragm to pump liquid through an inlet valve and an outlet valve.

17. The method of claim 16, wherein the material is formed from perfluoroalkoxy (PFA), polyfluoroethylenepropylene (FEP), or polytetrafluoroethylene (PTFE).

18. The method of claim 16, further comprising forming the plastically deformed diaphragm as a multi-layer structure having at least one barrier layer to inhibit liquid fuel vapor permeation.

19. The method of claim 16, wherein the barrier layer is encapsulated between two elastomeric outer layers during forming.

20. The method of claim 16, further comprising positioning the plastically deformed diaphragm adjacent a vent opening and a vapor filter so that gases passing through the vent opening flow through the vapor filter to reduce hydrocarbon emissions.

21. A method of forming a diaphragm for a liquid pump, comprising:
   providing a substantially planar piece of material with a periphery and a radially inward portion, inboard of the periphery;
   clamping the material by trapping the periphery between opposed clamps, exposing the radially inward portion;
   plastically deforming the central portion by pressing the radially inward portion with a central forming member until the substantially planar piece of material deforms beyond an elastic limit to retain an offset non-planar shape including a frustoconical portion with a generally flat center region, while maintaining the diaphragm continuous and without perforations; and
   assembling the plastically deformed diaphragm into a pump housing of the liquid pump to separate a liquid fuel chamber from a pressure chamber.

22. The method of claim 21, wherein plastically deforming the radially inward portion forms a frustro-conical shape defining a flat central portion and a tapered sidewall extending between the flat central portion and the periphery.

23. The method of claim 21, wherein the material is formed from perfluoroalkoxy (PFA), polyfluoroethylenepropylene (FEP), or polytetrafluoroethylene (PTFE).

* * * * *